Oct. 8, 1968 SVEN-ERIK WALLIN 3,405,395
CIRCUIT ARRANGEMENT FOR ACTIVATING AN ELECTRIC CIRCUIT
BY MEANS OF AN INSTRUCTION WORD
Filed April 12, 1966
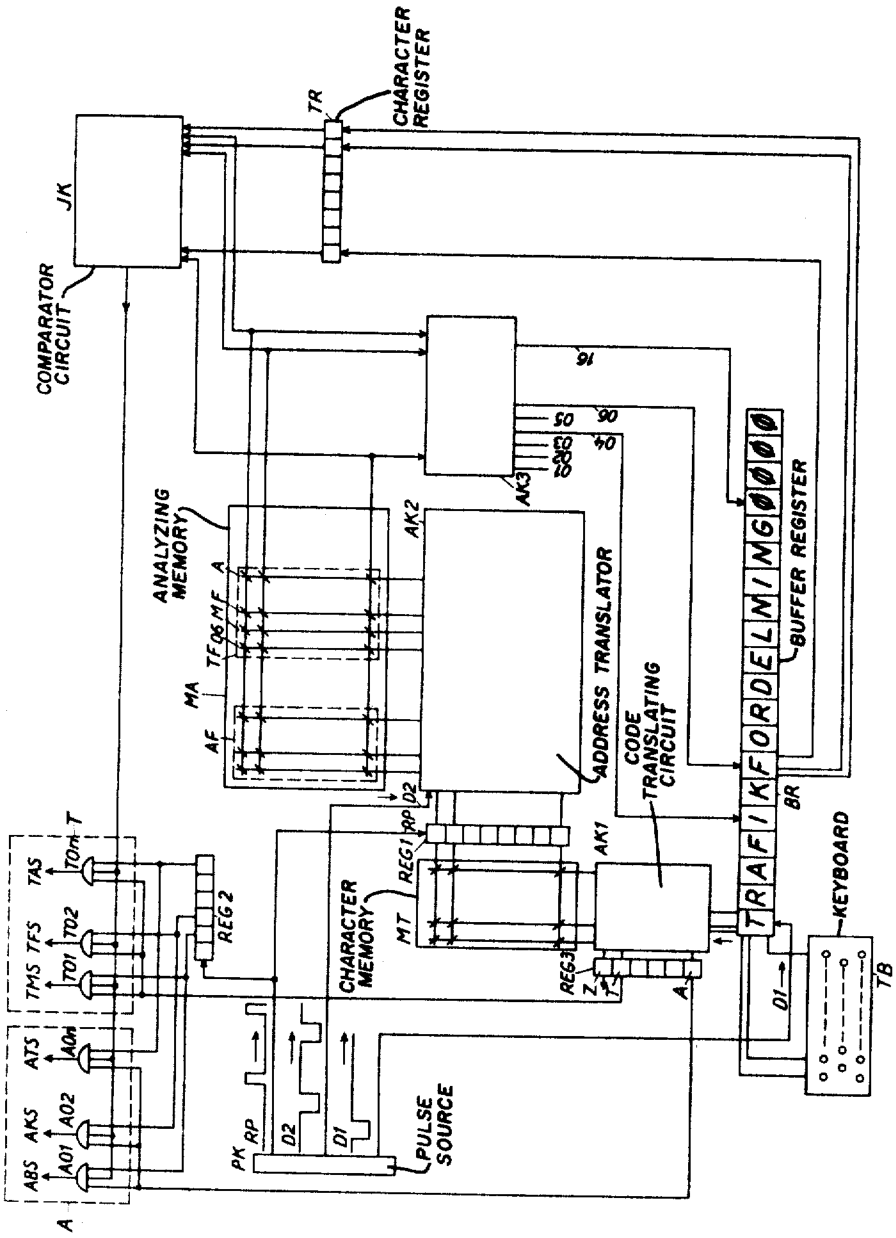
INVENTOR.
Sven-Erik Wallin
BY Hane and Nydick
Attorneys United States Patent Office 3,405,395

Patented Oct. 8, 1968

3,405,395

CIRCUIT ARRANGEMENT FOR ACTIVATING AN ELECTRIC CIRCUIT BY MEANS OF AN INSTRUCTION WORD

Sven-Erik Wallin, Enskede, Sweden, assignor to Telefonaktiebolaget L M Ericsson, Stockholm, Sweden, a corporation of Sweden Filed Apr. 12, 1966, Ser. No. 542,147
Claims priority, application Sweden, Apr. 27, 1965, 5,457/65
3 Claims. (Cl. 340—172.5)

ABSTRACT OF THE DISCLOSURE

There is disclosed a circuit system for operating a circuit selected among a plurality of circuits wherein a unique instruction word is associated with each of the circuits. The instruction words are recorded in memory in word rows and character columns. An indication is separately recorded of the location of the first column in memory in which all characters are different from each other. When a test word is stored in a buffer register to be compared with the words stored in memory, only that character of the test word which corresponds in position to said first column in memory with all different characters is compared with the characters in said memory column in order to select the word in memory corresponding to the test word and thus select one of the plurality of circuits.

The present invention refers to a circuit arrangement for activating a circuit selected arbitrarily among a number of electric circuits, by means of an instruction word associated with the respective circuit in which circuit arrangement said instruction word is written in binary form into a buffer register, for example by means of a keyboard, and is compared with instruction words recorded in binary form in a memory and when identical with one of these last mentioned words an operating signal is obtained.

Such an arrangement can be used for example in a computer controlled telephone system for controlling certain measuring or testing operations. The intended instruction is written in the form of an instruction word by means of the keyboard and when identity has been obtained with a recorded instruction word switching operations are started which are controlled by this instruction word. A comparison between relatively long instruction words consisting of alpha numerical characters necessitates an expensive equipment and the purpose of this invention is to provide an arrangement which provides a relatively simple way for controlling the switching operations by means of instruction words consisting of alpha numerical characters.

The circuit arrangement according to the invention resides substantially in that the memory the content of which is compared with the instruction word comprises a number of memory fields corresponding to the initial characters of each of the instruction words in question. The memory fields contain each a memory group for a further character in each instruction word, the position of said further character being selected in such a way that the character located in this position is different from all instruction words having the same initial character. A memory group indicates the position number of said further character. The circuit arrangement comprises translating and reading means respectively for selecting the respective memory fields in the memory with the guidance of an address dependent on the initial character and for reading the records in the memory groups, one after the other, beginning with the memory group defining the position number of said further character. Reading means supply guided by the position number of said further character the character which is written in the register in this position to a comparator device which obtains sequentially the records read out from the memory groups for comparison with said character until an indication of identity with said character a coincidence signal is obtained from the comparator circuit. The circuits associated with the respective instruction words receive an operating signal simultaneously with the reading of the memory group in the memory associated with the instruction word, and furthermore receive said coincidence signal, said circuits being so arranged that only that circuit can be controlled in which said two conditions occur simultaneously.

The invention will be explained more in detail with reference to the single figure of the drawing showing a block diagram of a circuit arrangement according to the invention.

By TB is indicated a keyboard by means of which alpha numerical characters can be written into a buffer register BR. The buffer register BR is of a known type consisting of a number of, for example eight, magnet cores for each character. The magnet cores can be magnetized accordingly to a code corresponding to the characters. The type of the buffer register which is used, is not essential for the understanding of the invention; it may for example consist of eight bistable circuits for each character position.

By supplying a reading pulse D1 to the first character position of the buffer register, the written character can be read out in code form and supplied to a code translating and driving circuit AK1 of a known type. This circuit consists for example of a diode matrix which has eight inputs corresponding to the code consisting of eight signal elements and has a number of outputs corresponding to the number of characters in the alphabet. One of these outputs is activated when receiving the pulse-shaped code signal from the first character position of the buffer register so that a pulse-shaped signal which is amplified in a known manner is supplied to one of the columns in a character memory MT. The magnet cores in each of the columns are magnetized according to a code. This magnetization is maintained irrespective of how many times reading is carried out. When one of the outputs from the circuit AK1 is activated, a reading from the character memory is thus effected and a code-shaped signal is obtained on the outputs of the character memory MT. Said code represents an address in a memory field as it will be explained. The signals obtained from the outputs of the character memory are supplied to a register REG1 of a known type having a number of stages consisting of binary bistable circuits. This register when obtaining a progressing pulse changes the written value with a binary unit upwards or downwards corresponding to a preselected direction. Upon writing the address code into the register REG1, there appears in the outputs of the register stages an address code which is supplied to an address translator AK2 of a known type, consisting of for example a diode matrix and gate circuits. The address transistor AK2 is provided with a number of outputs combined in groups in such a way that each group belongs to one of the respective initial characters. One wire within each group is associated with each of the characters in each word which have to be compared with a character written in a definite digit position in the buffer register. According to the principle of the invention it is sufficient, instead of comparing the whole instruction word with the instruction words written in the memory, to compare only one character in a position selected in such a manner that the characters are different for all instruction words beginning with the same initial character.

The arrangement according to the invention includes a further memory, an analyzing memory MA containing analyzing fields each corresponding to one of the initial characters. In said fields magnet cores are magnetized in such a way that in each of the columns included in the field there is registered in binary form one character comprised in one of the instruction words beginning with the same character. This character has in all these instruction words a definite position, for example the sixth character according to the embodiment. It has been assumed that in the telephone system in which the arrangement according to the invention is used, it is required to make a difference between five instruction words which are the following:

| Sign position | 00 | 01 | 02 | 03 | 04 | 05 | 06 | 07 | 08 | 09 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| | T | R | A | F | I | K | M | A | T | N | I | N | G | | | | | | | | |
| | T | R | A | F | I | K | F | O | R | D | E | L | N | I | N | G | | | | | |
| | T | R | A | F | I | K | V | A | G | S | P | R | O | V | N | I | N | G | | | |
| | T | R | A | N | S | M | I | S | S | I | O | N | S | P | R | O | V | N | I | N | G |
| | T | I | L | L | S | T | A | N | D | S | F | O | R | D | E | L | N | I | N | G | |

As is apparent the characters in the sixth character position are different in all the words, thus it is sufficient to compare only the sixth character if the words have the same initial character. Correspondingly, in the analyzing field TF associated with the initial character T the respective columns are each magnetized in accordance with the binary code corresponding to the sixth character M, F, V, I and A in the respective words. Furthermore one column is magnetized in such a way that it contains the information 06 in binary form. The magnetization of the memory field is, of course, arranged for non-destructive reading.

When for example the instruction word TRAFIKFORDELNING has been written into the buffer register, a reading pulse D1 is supplied to the first character position in consequence of which said character is supplied to the code translating circuit AK1 in the form of an eight-digit binary code and the output of the code translating circuit corresponding to the character T is activated. Hereby a reading from the character memory MT is carried out from the column associated with the character T in which column is written the address of the field in the analyzing memory MA associated with the character T. The pulse-shaped reading signals obtained from the character memory operate the register REG1, from the stages of which binary signals are obtained in correspondence with the address of the analyzing field TF associated with the character T. If for example the first column of the analyzing field is the 32nd from the right the address written in the register REG1 will be 00100000.

To the code translating circuit AK1 is connected also a register REG3 in which each stage corresponds to a character in the alphabet. This register has the function that the one of its outputs which correspond to the initial character, is maintained activated during the whole comparison process whereas the signal from the code translating circuit AK1 is obtained only during the reading out of the first character position.

Due to the fact that the address code translating circuit AK2 obtains signals from the register REG1 through definite inputs, the output from AK2 is already selected which has to read the first column in the analyzing field TF. When a reading pulse D2 is fed to the address translating circuit AK2 which is of a known type consisting of diodes and gates, a reading pulse is fed to the first column in the analyzing field TF which column contains the information 06, that is, the number of the character position in the buffer register in which the written character is to be compared with the analyzing field. The read out binary pulse code representing the digit 06 is supplied to an address translating circuit AK3 on the sixth output of which, after amplification in a known manner, a signal is obtained which reads out the code signal of the character F written in the character position 06. This binary code is registered in a character register TR the stages of which consist of binary bistable circuits and each supply an output signal to a comparator circuit JK. In this comparator circuit should be compared each of the codes written in the columns of the analyzing field with the binary code of the character F. From the pulse source PK a progressing pulse RP is now fed to the register REG1 which indicates that from the address written in the register a binary unit is subtracted, that is, the address is decreased by 1. Upon obtaining the next reading pulse D2, the succeeding column in the analyzing field, according to the example the column M, will consequently be read and on the outputs from the memory MA a pulse code is obtained in correspondence with the character M. This code is supplied to the inputs of the comparator circuit JK on the corresponding inputs of which the output signals from the stages of the character register TR are already applied. Upon coincidence between all output signals, a coincidence signal is obtained from the output of the comparator circuit. If no coincidence signal is obtained, the progressing of REG1 will continue, that is, a further binary unit is subtracted from the address and the column F in the analyzing field TF is read out. The comparator circuit JK now obtains the binary code of the character F simultaneously with the signals from the character register TR. Due to the fact that also the character register contains the code of the character F, a coincidence signal will be obtained.

The circuit arrangement can comprise a code translating circuit of a known type to prevent that the selection in the analyzing field continues if the last column is reached without finding coincidence. Said code translating circuit is, however, not shown in detail as its use is obvious and it is also not shown how it is prevented that the selection continues when coincidence has been found.

The control wires which activate the electrical circuits to be controlled are indicated by ABS, AKS and ATS associated with the initial character A and by TMS, TFS and TAS associated with the initial character T. These control wires are activated in dependence on the simultaneous presence of three conditions. This is indicated by means of and-circuits A01, A02 . . . A0*n* and T01, T02 . . . T0*n* respectively. One of the conditions is that the signal corresponding to the initial character and occurring according to the example on the output T from the register REG2, is supplied to one of the inputs of the respective and-circuit. This condition exists during the whole comparison operation in each of the and-circuits associated with the initial character, according to the example T. The second condition is that a coincidence signal is obtained from the comparator circuit JK. The third condition is that simultaneously with the coincidence pulse the respective and-circuit obtains a pulse indicating that it was the column corresponding to this and-circuit, that is, the character in the analyzing field that has been read when the coincidence signal occurs. This third input of the and-circuits is thus activated sequentially simultaneously with the reading of the respective record in the analyzing field. This is carried out by means of a shift register REG2 in which the outputs from the subsequent stages are connected to the and-circuits TMS, TFS and so on. In the rest position the shift register REG2 is set in such a way that its first stage from the left is activated. The shift register REG2 is activated simultaneously with register REG1 by means of the progressing pulses RP which produce on one hand a decrease by 1 of the address written in register REG1 and simultaneously the progressing of the activated stage of register REG2 in which in the rest position the first stage is activated. The first counting pulse will activate the output from the second stage which output is connected to the and-circuit T01 belonging to the character M simultaneously as the character M is read out from the analyzing field and is compared with the character F written in the character register TR. No coincidence signal is obtained and thus the third input condition is not fulfilled. The next progressing pulse RP activates the input to the and-circuit T02 simultaneously as is causes reading of the character F from the analyzing field and a comparison is carried out with the record provided in the register TR. In view of the fact that the written character has been F, a coincidence signal is obtained from the comparator circuit JK simultaneously as the other two inputs to the and-circuit T02 are activated. This implies that a signal is obtained on the output TFS and the circuit corresponding to the instruction word, TRAFIKFORDELNING, is activated. The zero-setting of the means which have been operated, is carried out in known way and is not described in detail as it does not constitute the object of the invention.

The pulses obtained from the pulse source PK are indicated in the figure in the chronological order in which they occur. First occurs the reading pulse D1 which reads the address code written in the first digit position, then occurs the reading pulse D2 that reads the character information written in that one of the columns in the analyzing field which is selected by the address in register REG1 and thereafter follows a progressing pulse which according to the example subtracts a binary unit from the address, so that the next column in the analyzing field can be read by the pulse D2. The pulses D2 and RP occur alternating with each other while the pulse D1 occurs only once at the beginning of the comparing process.

The arrangement described constitutes only an embodiment of the invention and also the carrying out of the function described by means of a computer lies within the scope of the invention in which case there are no fixedly connected circuits but the writing into the registers, the reading from the memories and the comparison are controlled by a program.

I claim:

1. A circuit arrangement for operating by means of an instruction word an electric circuit selected arbitrarily among a plurality of circuits, including register means in which said instruction word can be written temporarily in code form, a memory having a number of memory fields each corresponding to the initial character of one of the possible instruction words, reading means for reading out the initial character of an instruction word written in said register means (BR), and translating means (AK2) for selecting a memory field in said memory corresponding to said readout initial character, each of said memory fields having a first record defining in code form a further character position in which the character in each instruction word beginning with the same character differs from the character in the corresponding character position in all the other instruction words, and having further records defining in code form each of said different characters in the respective words in said further position, reading means for reading said records in the memory field selected, one after the other so as to produce code signals, translating and reading means activated by the code signal produced by the reading of said first record so as to read out the character written in said further character position in said register means and produce a code signal, and a comparison circuit supplied by said last mentioned code signal and by said code signals from the memory field respectively so as to compare the first with the latter and to produce upon coincidence a signal on a conductor, means for producing simultaneously with the reading of each of said further records in said memory fields a signal on separate conductors each associated with a definite record, a control circuit for each of said circuits to be operated and having an input connected to one of said separate conductors and another input connected to said coincidence signal conductor so as to be activated upon the occurrence of both signals.

2. A circuit arrangement according to claim 1, and further comprising means for stopping the reading of the memory groups when the last memory group in a memory field has been read without finding coincidence.

3. A circuit arrangement according to claim 1, wherein the circuits (TMS, TFS, a.s.o.) associated with the respective instruction word obtain as a condition for functioning during the whole comparison process, a signal that is dependent on the first letter written in the buffer register (BR).

References Cited

Associative Memories—A Many-Pronged Design Report, Alan Cornetetto, Electronics Design, Feb. 1, 1963, pp. 40–55.

A Method of Resolving Multiple Responses In a Parallel Search File, E. H. Frei et al., IRE Transactions On Electronic Computers, December 1961, pp. 718–722.

PAUL J. HENON, *Primary Examiner.*

ROBERT C. BAILEY, *Examiner.*

I. S. KAVRUKOV, *Assistant Examiner.*